United States Patent [19]
Tomaru et al.

[11] Patent Number: 5,547,221
[45] Date of Patent: Aug. 20, 1996

[54] ENERGY ABSORBING MEMBER FOR SHOCK ABSORBING STEERING COLUMN APPARATUS

[75] Inventors: Masaki Tomaru, Shibukawa; Seiichi Moriyama, Takasaki; Kiyoshi Sadakata, Gunma-ken, all of Japan

[73] Assignee: NSK, Ltd., Tokyo, Japan

[21] Appl. No.: 404,617

[22] Filed: Mar. 15, 1995

[30] Foreign Application Priority Data

Mar. 25, 1994 [JP] Japan .................................. 6-056004

[51] Int. Cl.⁶ ..................................................... B62D 1/19
[52] U.S. Cl. ............................................. 280/777; 74/492
[58] Field of Search ................................. 280/777, 779, 280/780; 74/492; 188/371

[56] References Cited

U.S. PATENT DOCUMENTS 5,052,716 10/1991 Matsumoto ........................... 280/777

FOREIGN PATENT DOCUMENTS

| | | |
|---|---|---|
| 63-76578 | 5/1988 | Japan . |
| 3-9974 | 1/1991 | Japan . |
| 4-2772 | 1/1992 | Japan . |
| 1584984 | 2/1981 | United Kingdom . |

*Primary Examiner*—Paul N. Dickson
*Attorney, Agent, or Firm*—Shapiro and Shapiro

[57] ABSTRACT

An energy absorbing member is constructed of a main body including a base and a belt portion having first and second folded portions and an interconnecting plate welded to the main body. A middle portion of the belt portion is confined between an upper surface of the base and a lower surface of the interconnecting plate. Thus, the energy absorbing member itself provides two surfaces for guiding the belt portion. Assembly of a shock absorbing steering column apparatus is thereby facilitated and a compact apparatus can be realized.

14 Claims, 8 Drawing Sheets

ENERGY ABSORBING MEMBER FOR SHOCK ABSORBING STEERING COLUMN APPARATUS

BACKGROUND OF THE INVENTION

1. Field of the Invention

An energy absorbing member for shock absorbing steering column apparatus according to the present invention is connected between a steering column and a car body, thus constructing a shock absorbing steering column apparatus. The shock absorbing steering column apparatus is designed to protect the passenger's life upon crash by displacing the steering column ahead while absorbing shock and relieving impact exerted on the passenger's body upon crash.

2. Related Background Art

In a car crash, following a so-called primary collision, where a car collides with an object, such as another car, a so-called secondary collision, where a driver collides with a steering wheel, will occur. In order to lower the impact exerted on the driver upon the secondary collision so as to protect the driver's life, it is conventional that the steering shaft with a steering wheel fixed at one end thereof is constructed as a so-called collapsible steering shaft, the total length of which is decreased with application of strong impact thereon, and the steering column through which the steering shaft is inserted is constructed as a shock absorbing type.

Figure 9:
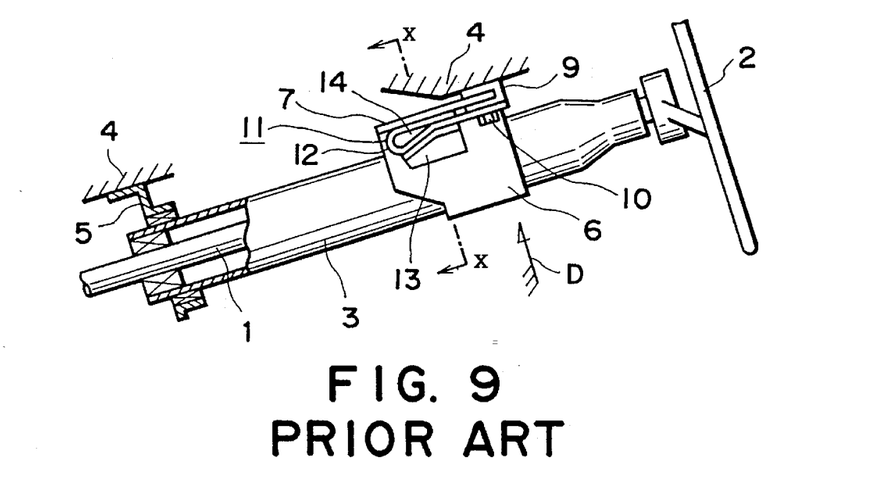
FIG. 9 is a side view showing a first example of the conventional structure.
Figure 10:
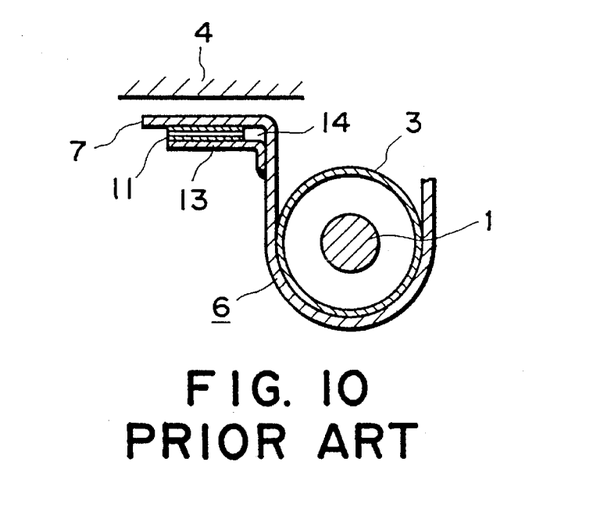
FIG. 10 is a partial cross section taken along X—X in FIG. 9.
Figure 11:
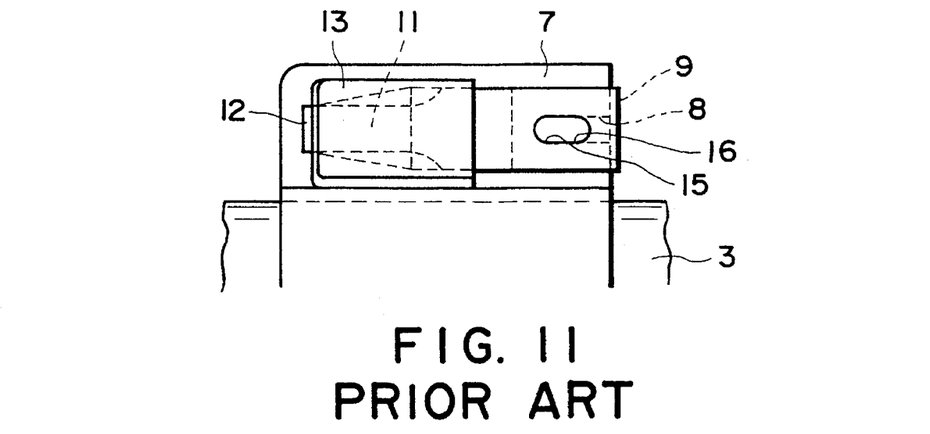
FIG. 11 is a view observed along the direction of arrow D in FIG. 9.

A conventional example of the steering column apparatus of the shock absorbing type used for such a purpose is one disclosed in Japanese Laid-open Utility Model Application No. 63-76578. FIGS. 9 to 12 show the shock-absorbing steering column apparatus as described in the application. As shown in FIG. 9, a steering shaft 1 has a steering wheel 2 fixed to a rear end (right upper end in FIG. 9) thereof and is arranged to rotate through manipulation of the steering wheel 2. The steering shaft 1 is so arranged that the total length thereof contracts with application of axial impact via a telescopic mechanism, (not shown), for example, a spline engagement. A tubular steering column 3 with the steering shaft 1 inserted therein is fixed to portions of body 4, e.g., to a lower surface of dash board, so as to be supported at an intermediate portion and a lower end portion. Namely, the lower end of steering column 3 is supported by a lower support bracket 5 fixed to a part of body 4 so as to be slidable along the axial direction.

On the other hand, an upper support bracket 6 formed by bending a metal plate is fixed, for example, by welding, to the outer periphery of the intermediate portion of the steering column 3. A pair of mount plate portions 7 are formed on either side of the upper support bracket 6 for securing the upper support bracket 6 to the body 4. A U-shaped cut 8 is formed in each mount plate portion 7 so as to be open on one edge (an edge on the steering wheel 2 side) of each mount plate portion 7. A stop member 9 formed in a long C shape of an aluminum alloy, a synthetic resin, or another material is externally fit over one edge of each mount plate portion 7 so as to cover the cut 8. Then a bolt 10 is inserted through a through hole 15 formed in the stop member 9, and through the cut 8 to mate with a thread hold provided on the body 4. Upon tightening this bolt 10, the stop member 9 strongly pinches the mount plate portion 7, whereby the upper support bracket 6 is supported through the stop member 9 by the body 4. In addition to the above arrangement where the bolt 10 is engaged with the thread hole provided on the body side, there are cases where a nut is brought into engagement with a bolt fixed to the car body.

Further, one end of energy absorbing member 11 is welded to each mount plate portion 7. A through hole is formed at the other end of energy absorbing member 11 and the bolt 10 is also set through this through hole 16. Each energy absorbing member 11 is made of a plastically deformable belt plate, for example, a metal plate of mild steel, and has a U-shape folded portion 12 in a middle portion. This folded portion 12 is pinched between the mount plate portion 7 and a guide plate 13 as next described, from above and below. Each guide plate 13 formed by pressing a metal plate is secured by welding to either side surface of the upper support bracket 6 below the mount plate portion 7, so that a guide space 14 for guiding the folded portion 12 of the energy absorbing member 11 is formed between the upper surface of each guide plate 13 and the lower surface of each mount plate portion 7.

The first conventional example of the shock absorbing steering column apparatus is designed to assure the safety of driver's life in a crash, by operating in the following manner. When impact is applied to the steering wheel 2 by a secondary collision during the crash, this impact is immediately transferred to the steering column 3, so that the steering column 3 is strongly pushed in its axial direction. When an impact force exerted in the axial direction of steering column 3 exceeds a frictional force acting between the mount plate portions 7 and the stop members 9, the mount plate portions 7 slip off the bolts 10 via the cuts 8 formed in the mount plate portions 7, thus making the steering column 3 free to be displaced.

Figure 12:
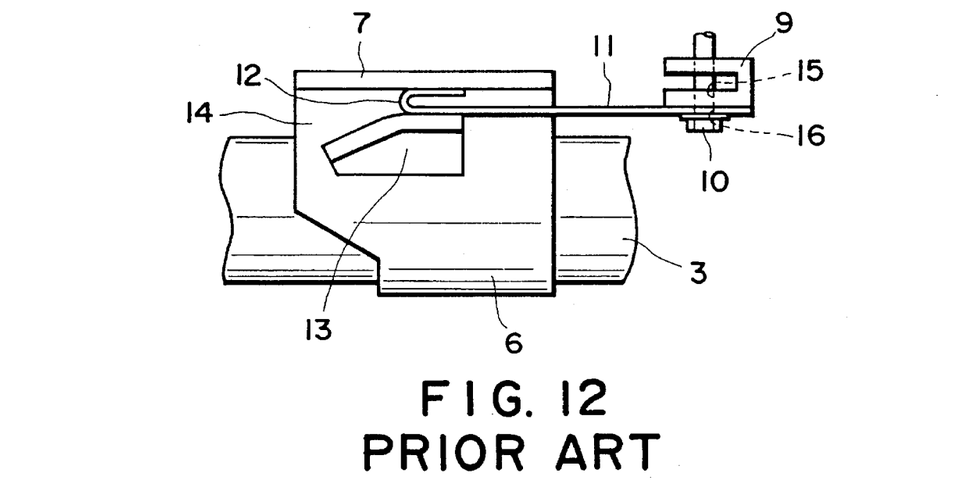
FIG. 12 is an enlarged view of the central portion of FIG. 9 showing a deformed state of an energy absorbing member due to secondary collision.

As a result, the steering column 3 is displaced ahead in the axial direction (left downward in FIG. 9) because of the impact force. With this displacement, each energy absorbing member 11 will be stretched as shown in FIG. 12. While each energy absorbing member 11 is thus stretched from the state shown in FIG. 9 to the state shown in FIG. 12, the folded portion 12 formed in the middle portion of the each energy absorbing member 11 moves from the other end side (the right side in FIG. 12) connected with the bolt 10 to one end side (the left side in FIG. 12) connected with the mount plate portion 7.

When the folded portion 12 moves in this manner, portions of the energy absorbing member 11 are plastically deformed so as to absorb the impact exerted on the steering column 3 through the steering wheel 2 by the driver's body. In the case of the depicted example, a part of the upper surface of guide plate 13 is inclined, so that the height of the guide space 14 for guiding the folded portion 12 of the each energy absorbing member 11 is gradually decreased. Because of this arrangement, in the case of the depicted example, the impact force absorbed by the energy absorbing members 11 gradually increases, thus enabling effective shock absorption.

Figure 13:
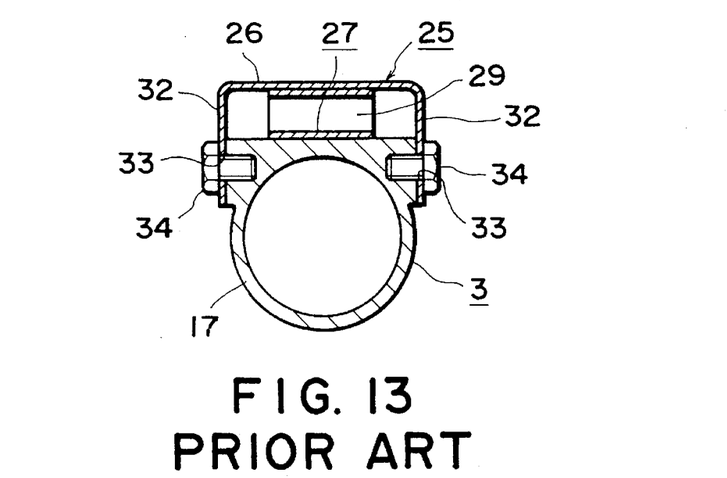
FIG. 13 is a cross section showing a second example of the conventional structure.
Figure 14:
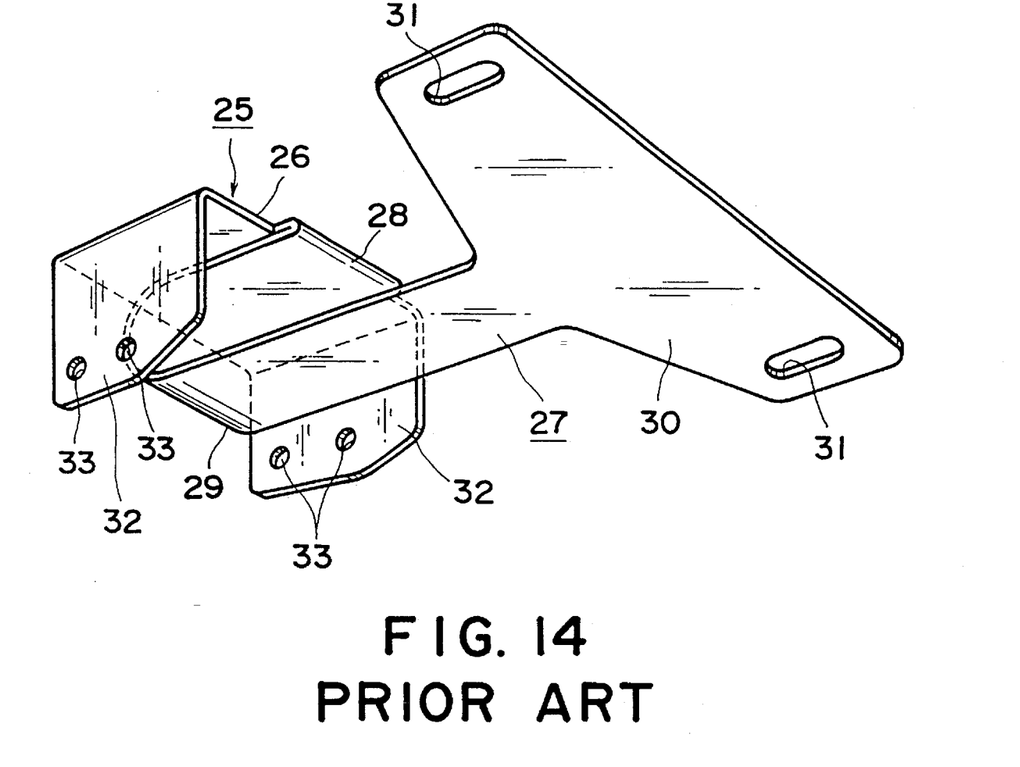
FIG. 14 is a perspective view of an energy absorbing member used in the second example.
Figure 15:
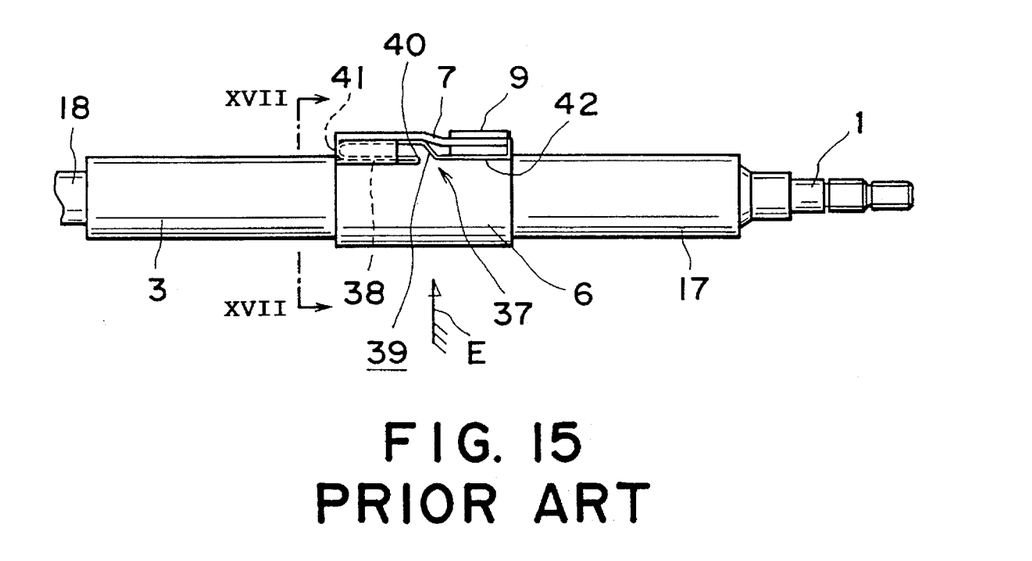
FIG. 15 is a side view showing a third example of the conventional structure.
Figure 16:
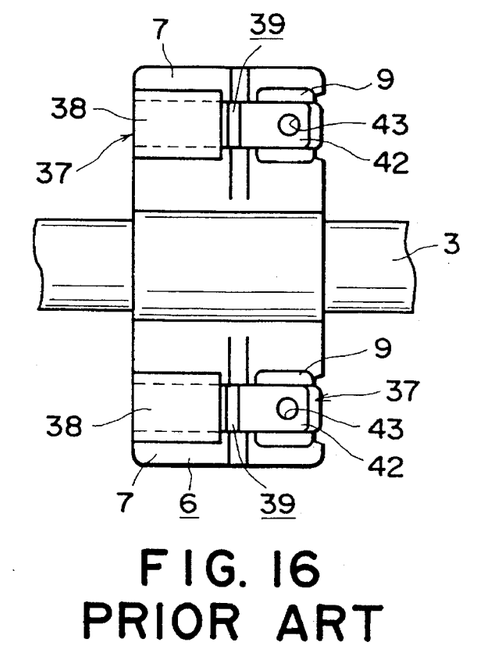
FIG. 16 is a view observed along the direction of arrow E in FIG. 15.
Figure 17:
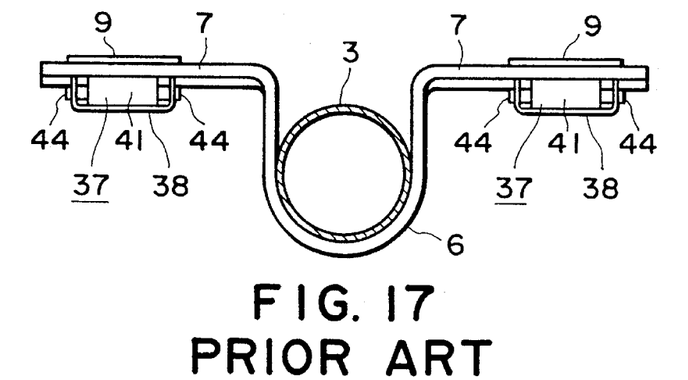
FIG. 17 is a cross section taken along XVII—XVII in FIG. 15.

Further, Japanese Laid-open Utility Model Application No. 4-2772 describes the shock-absorbing steering column apparatus having the structure shown in FIGS. 13 and 14. An energy absorbing member 25 is formed in the shape as shown in FIG. 14 as a plastically deformable plate, and has a base 26 and a plastically deformable belt portion 27 extending from the rear edge (the right edge in FIG. 14) of the base 26. A base end portion of this belt portion 27 extends forward and then is folded approximately 180 degrees with a sufficiently small radius of curvature to form a first folded portion 28. Further, a center portion of the belt portion 27 is folded in a U shape in a larger radius of curvature than that of the first folded portion 28 and in the opposite direction to the folded direction of the first folded portion 28 to form a second folded portion 29. Further, a connecting portion 30 is formed in a portion projecting backward further over the rear edge of the base 26 and, located at the distal end portion (the right end portion of FIG. 14) of the belt portion 27. Through holes 31, 31 are formed on either end portion of the connecting portion 30 in the transverse direction. Further, a pair of bent portions 32, 32 are formed by bending from both side edges of the base 26 toward the side where the belt portion 27 is present. Circular holes 33, 33 are formed in the free end portion (the lower edge portion of FIG. 14) of each bent portion 32, 32.

The fore end portion of the energy absorbing member 25 formed as described above is fixed to the upper surface of the outer column 17 in such a manner that the lower end portions of the pair of bent portions 32, 32 are secured to the outer side surfaces of the middle portion of the outer column 17 by bolts 34, 34 through the respective through holes 33, 33 as shown in FIG. 13. While the bent portions 32, 32 provided at one end of the energy absorbing member 25 are secured to the side surfaces of the outer column 17, the second folded portion 29 of the energy absorbing member 25 is pinched between the upper surface of the outer column 17 and the lower surface of the base 26.

The connecting portion 30 provided at the rear end of the energy absorbing member 25 is coupled with bolts 10 by inserting the bolts 10 (FIG. 9 and FIG. 12) through the through holes 31, 31 formed at the left and right end portions, so as not to be disengageable. Further, each bolt 10 passes through the cut 8 formed in the mount plate portion 7 and the through hole 15 (FIG. 12) formed in the stop member 9 mounted to each mount plate portion 7 so as to cover the cut 8, and mates with a thread hole formed in the lower surface of body 4 (FIG. 9), as described previously. The second conventional example of the shock absorbing steering column apparatus in the above structure has substantially the same operation to absorb impact energy due to secondary collision, thereby to maintain the safety of a driver's life in a crash accident as that in the first conventional example of the shock absorbing steering column apparatus described above.

Further, Japanese Laid-open Patent Application No. 3-9974 describes the shock-absorbing steering column apparatus having the structure shown in FIGS. 15 to 18. Inside the steering column 3 the steering shaft 1 having the steering wheel fixed at one end (the right end in FIG. 15) thereof is inserted so as to be rotatable. The upper support bracket 6 having the mount plate portions 7 for mounting to the body on either side is fixed by welding to the middle portion of the steering column 3. In the depicted example the steering column 3 is of the so-called collapsible type in which the outer column 17 and inner column 18 are combined in a telescopic manner.

Figure 18:
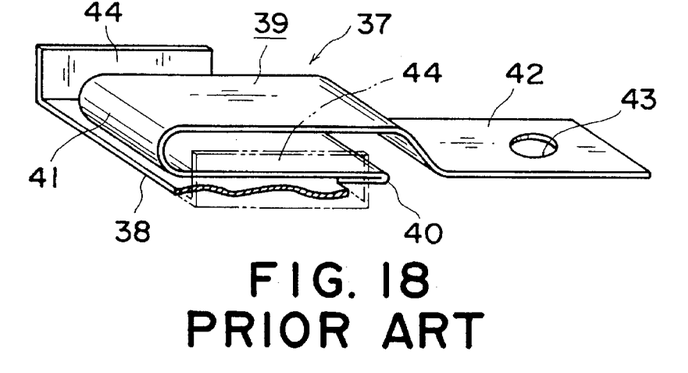
FIG. 18 is a perspective view of an energy absorbing member used in the third example.

Each energy absorbing member 37 has a base 38 as shown in FIG. 18, and a plastically deformable belt portion 39 extends from the rear edge (the right edge in FIG. 18) of this base 38. The base end portion of this belt portion 39 is folded by approximately 180 degrees with a sufficiently small radius of curvature to form a first folded portion 40. Further, the middle portion of the belt portion 39 is folded in a U shape with a larger radius of curvature than that of the first folded portion 40 and in the opposite direction to that of the first folded portion 40 to form a second folded portion 41. A connecting portion 42 is formed in the fore end portion (the right end portion in FIG. 18) of the belt portion 39 to project backward relative to the rear edge of the base 38. A through hole 43 is formed in this connecting portion 42. Upon assembling the shock absorbing steering column apparatus, a bolt 10 (FIG. 9 or FIG. 12) is inserted through the through hole 43 to secure the fore end portion of the belt portion 39 to the car body. Further, a pair of bent portions 44, 44 are formed by bending from the both side edges of the base 38 toward the side where the belt portion 39 is present.

The energy absorbing member 37 formed as described above is fixed to the lower surface of each mount plate portion 7, 7 at the front end portion thereof in such a manner that the upper edges of the pair of bent portions 44, 44 are made to abut against the lower surface of the mount plate portion 7, 7 of the upper support bracket 6 and then the abutting portions are welded. While the front end portion of the energy absorbing member 37 is fixed to the lower surface of the mount plate portion 7, 7 in this manner, the second folded portion 41 of the energy absorbing member 37 is pinched between the mount plate portion 7, 7 and the base 38.

The third conventional example of the shock absorbing steering column apparatus in the above structure functions substantially in the same manner as the first and second conventional examples of the shock absorbing steering column apparatus described above so as to absorb the impact energy due to the secondary collision in a crash to maintain the safety of a driver's life.

Incidentally, in order to effect the plastic deformation of the energy absorbing member 11, 25, 37 in a smooth manner upon secondary collision so as to efficiently absorb the impact applied on the steering column 3 during a collision, it is necessary to accurately define the distance between the two surfaces pinching the folded portion 12 or the second folded portion 29, 41 formed in the energy absorbing member 11, 25, 37, as designed. If the distance is too long (or if the two surfaces are too far from each other), the energy absorbing member 11, 25, 37 with the folded portion 12 or the second folded portion 29, 41 formed therein is plastically deformed relatively easily, resulting in insufficient absorption of impact energy. In contrast, if the distance is too short (or if the two surfaces are too close to each other), the energy necessary to plastically deform the energy absorbing member 11, 25, 37 having the folded portion 12 or the second folded portion 29, 41 formed therein becomes to great, thus resulting in insufficient absorption of impact energy as well.

In the case of the structure in the first conventional example illustrated in FIGS. 9 to 12, troublesome work is necessary to accurately define the distance between the lower surface of the mount plate portion 7 and the upper surface of the guide plate 13, as designed. Conventionally, each guide plate 13 was welded to the side surface of the upper support bracket 6, while keeping an actually assembled energy absorbing member 11 pinched between the two surfaces. This resulted in poor workability and increased the production costs of the shock absorbing steering column apparatus.

In the case of the structures in the second conventional example illustrated in FIGS. 13 and 14 and in the third conventional example shown in FIGS. 15 to 18, because the energy absorbing member 25, 37 itself forms one of the two surfaces, the assembling workability is better than that in the first conventional example. Even in the cases of these second and third conventional examples, however, the other surface needs to be provided by the member to which the energy absorbing member 25, 37 is mounted, for example in the upper support bracket 6.

It is necessary that the surfaces pinching the folded portion 28, 40 or the second folded portion 29, 41 be flat surfaces having sufficient areas. Accordingly, a flat surface needs to be provided by, for example, the upper support bracket 6. However, it might be difficult to obtain the necessary flat surface in some cases where a setting space of the upper support bracket 6 cannot be fully taken, for example in the case of the steering column apparatus for light cars.

SUMMARY OF THE INVENTION

The energy absorbing member for shock absorbing steering column apparatus of the present invention overcomes such problems.

The energy absorbing member for shock absorbing steering column apparatus according to the present invention is set between a portion fixed to the tubular steering column through which a steering shaft is inserted and a portion fixed to the car body and permits the steering column to be displaced forward while absorbing the impact energy applied to the steering column upon a crash accident, similarly to the conventional energy absorbing members incorporated in the shock absorbing steering column apparatus described above. However, the energy absorbing member of the present invention comprises a base, a plastically deformable belt portion extending from a rear edge of the base, a first folded portion formed by folding a base portion of the belt portion forward approximately 180 degrees with a sufficiently small radius of curvature, a second folded portion formed by folding a middle portion of the belt portion in a U shape with a larger radius of curvature than that of the first folded portion and in an opposite direction to that of the first folded portion, a connecting portion formed at a fore end portion of the belt portion and in a portion projecting further backward relative to the rear edge of the base, for connecting the fore end portion of the belt portion with the portion fixed to the car body, and a pair of bent portions bent from both side edges of the base toward the side where the belt portion is present.

Particularly, in the energy absorbing member for shock absorbing steering column apparatus of the present invention, an interconnecting plate is provided so as to be fixed to the free edges of the pair of bent portions in a state to interconnect the free edges with each other. Then the distance between the interconnecting plate and the base is defined to match with the thickness of the middle portion of the belt portion in which the second folded portion is formed, and the interconnecting plate is arranged to be freely engaged with the portion fixed to the steering column.

The shock absorbing steering column apparatus, in which the energy absorbing members of the present invention are incorporated, functions substantially in the same manner as the conventional shock absorbing steering column apparatus described previously, absorbing the impact energy due to the secondary collision in a crash so as to assure the safety of the driver's life. Namely, the second folded portions of the energy absorbing members are displaced upon the crash to absorb the impact energy.

Particularly, in the case of the energy absorbing member for shock absorbing steering column apparatus according to the present invention, because the distance between the interconnecting plate and the base is well defined to match with the thickness of the middle portion of the belt portion in which the second folded portion is formed, it is not always necessary to provide the member to which the energy absorbing member is mounted with a surface for pinching the middle portion. Accordingly, work for component control and manufacturing can be reduced, whereby the costs of the shock absorbing steering column apparatus can be decreased. Further, it can be assembled against, for example, a compact bracket portion, against which any of the conventional members could not be assembled.

DESCRIPTION OF THE PREFERRED EMBODIMENTS

FIGS. 1 to 4 show the first embodiment of the present invention. Inside the steering column 3, the steering shaft 1 with a steering wheel fixed at one end thereof (the right end in FIG. 1) is inserted so as to be rotatable. The upper support bracket (mounting member) 6 is fixed by welding to the middle portion of the steering column 3. The upper support bracket 6 has the mount plate portions 7 for mounting to the body on either side of the steering column 3 in the transverse direction (in the direction perpendicular to the plane of FIG. 1, in the vertical direction in FIG. 2, or in the horizontal direction in FIG. 3). An energy absorbing member 45, to which the present invention is directed, is constructed in such a manner that an interconnecting plate (interconnecting member) 47, which is a feature of the present invention, is welded to a main body 46 formed by pressing a plastically deformable metal plate, for example a mild steel plate, similar to the third example of the conventional structure previously described and shown in FIGS. 15 to 18.

The main body 46 has a base 38. A plastically deformable belt portion 39 extends from the rear edge (the right edge in FIGS. 1 and 2) of the base 38. The base end portion of the belt portion 39 is folded forward (to the left in FIGS. 1 and 2) approximately 180 degrees with a sufficiently small radius of curvature to form a first folded portion 40. Further, the middle portion of the belt portion 39 is folded in a U shape in a larger radius of curvature than that of the first folded portion 40 in the opposite direction to that of the first folded portion 40 to form a second folded portion 41. A connecting portion 42 is formed in the distal end portion (the right end portion in FIGS. 1, 2, and 4) of the belt portion 39 projecting further backward over the rear edge of the base 38. A through hole 43 is formed in the connecting portion 42. In assembly of the shock absorbing steering column apparatus, a bolt 10 is inserted through the through hole 43 to secure the fore end portion of the belt portion 39 to the car body. Since the through hole 43 is formed as an elongated hole extending in the longitudinal direction, the bolt 10 can be surely set through the through hole 43 even with some dimensional errors in constituent elements. Further, a pair of bent portions 44, 44 are formed by bending from both side edges of the base 38 toward the side where the belt portion 39 is present.

The interconnecting plate 47 is provided between free edges of the pair of bent portions 44, 44 so as to interconnect the free edges of the pair of bent portions 44, 44 with each other. In more detail, these free edges are made to abut against the lower surface of the interconnecting plate 47 and then the free edges are welded to the lower surface, thereby unitedly connecting the interconnecting plate 47 with the main body 46. In the thus unitedly connected state between the interconnecting plate 47 and the main body 46, a distance between the lower surface of the interconnecting plate 47 and the upper surface of the base 38 is made equal to the thickness of the middle portion of the belt portion 39 with the second folded portion 41 formed therein.

Further, a stop portion 48 is formed in a C-shaped cross section folded up at the fore end portion (the left end portion in FIGS. 1 and 2) of the interconnecting plate 47. Upon assembly of the shock absorbing steering column apparatus, the stop portion 48 is engaged with the fore edge (the left edge in FIG. 1) of the mount plate portion 7, which is a portion fixed to the steering column 3. The constituents other than the energy absorbing member 45, for example, the cut 8 (FIG. 11) formed at the rear edge of the mount plate portion 7 and the bolt 10 set through the cut 8 in order to secure the mount plate portion 7 to the body 4, are the same as those in the conventional structure described previously.

The shock absorbing steering column apparatus in which the energy absorbing members 45 of the present invention is incorporated functions substantially in the same manner as the conventional shock absorbing steering column apparatus described previously, as absorbing the impact energy due to the secondary collision in a crash so as to assure the safety of the driver's life. Namely, upon a crash, the second folded portion 41 formed in the main body 46 constituting the energy absorbing member 45 is displaced between the upper surface of the base 38 and the lower surface of the interconnecting plate 47, thereby absorbing the impact energy.

Particularly, in the case of the energy absorbing member for shock absorbing steering column apparatus according to the present invention, when producing the energy absorbing member 45, it is easy to accurately define the distance between the upper surface of the base 38 and the lower surface of the interconnecting plate 47 as designed. Further, no special, troublesome adjustment operation is required in mounting the energy absorbing member 45 to the lower surface of the mount plate portion 7. Accordingly, work for component control and production can be reduced and, therefore, the costs of the shock absorbing steering column apparatus can be decreased. In addition, the energy absorbing member can be assembled to, for example, a compact bracket portion, which was difficult with the conventional members.

Figure 1:
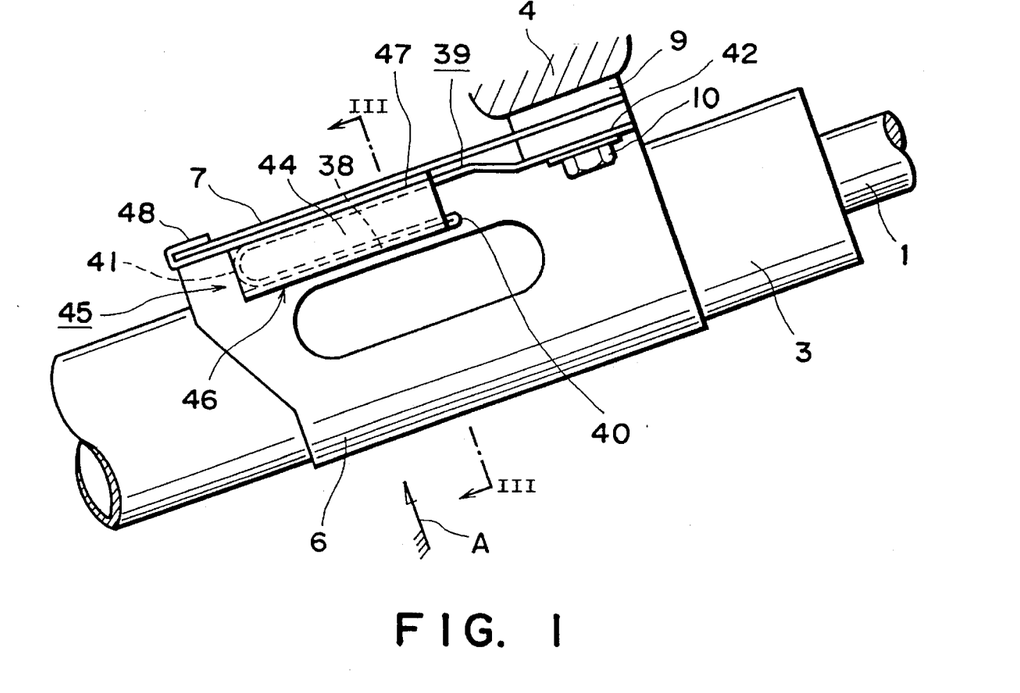
FIG. 1 is a side view showing the main part of a shock absorbing steering column apparatus in which energy absorbing members are incorporated, as a first example of the present invention.
Figure 2:
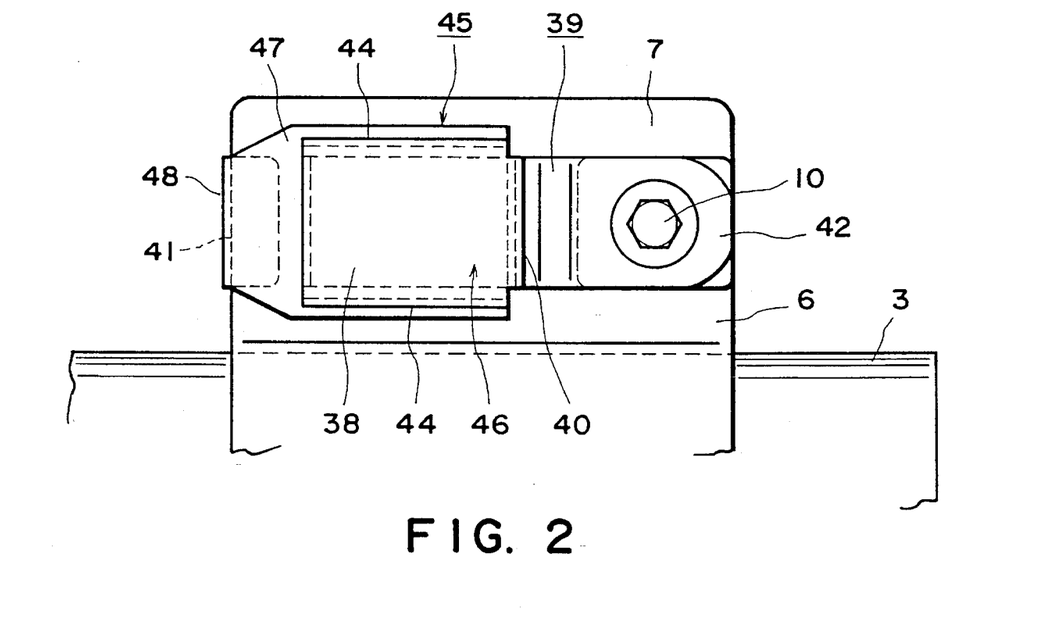
FIG. 2 is a view observed along the direction of arrow A in FIG. 1.
Figure 3:
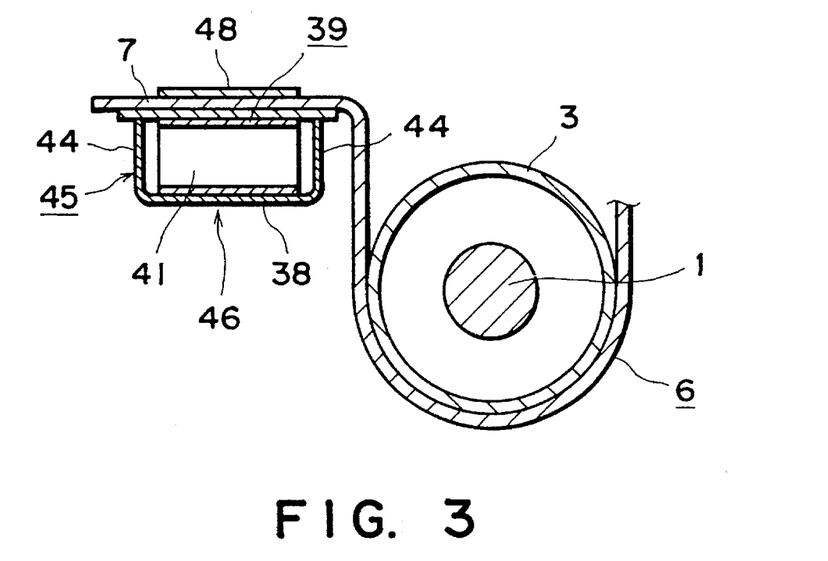
FIG. 3 is a cross section taken along III—III in FIG. 1.
Figure 4:
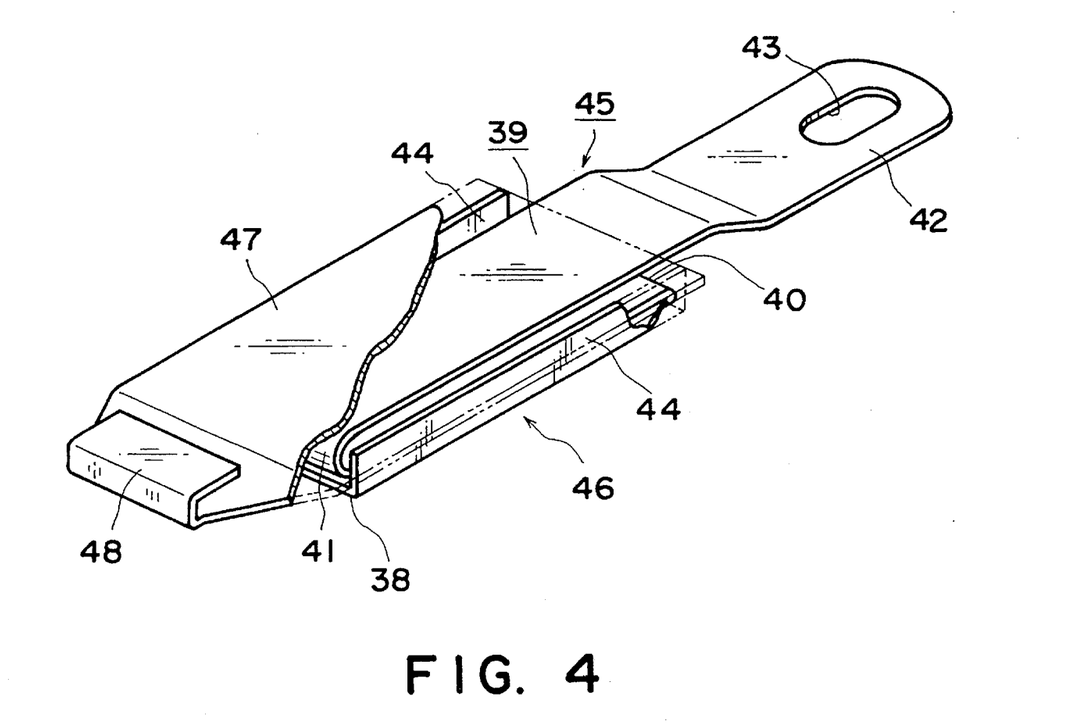
FIG. 4 is a perspective view, partly in cross section, showing an extracted part of an energy absorbing member.
Figure 5:
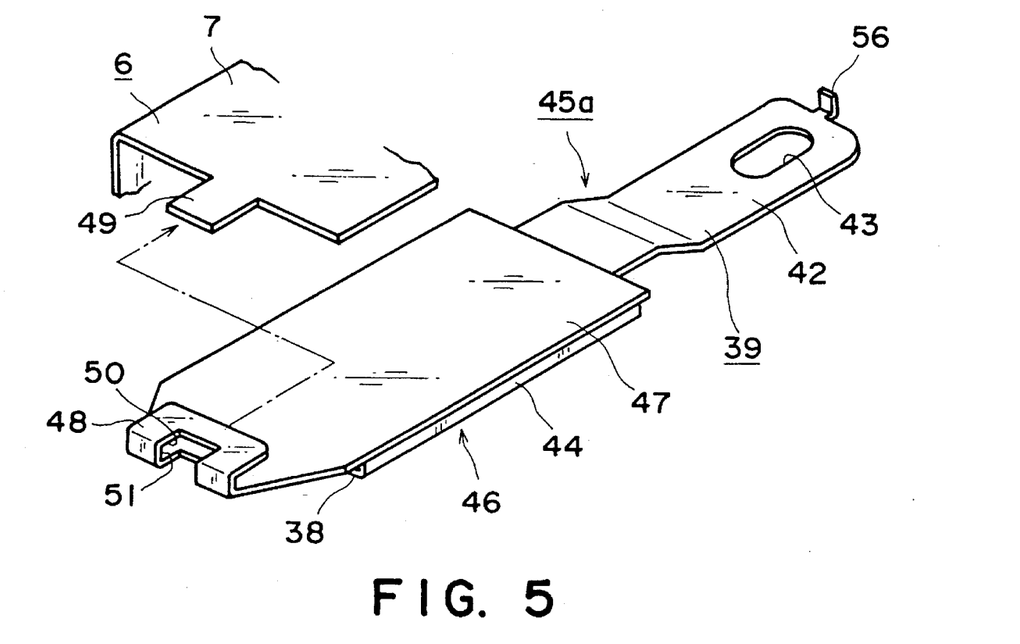
FIG. 5 is a perspective view showing all of an energy absorbing member and a part of a mount plate portion, as a second embodiment of the present invention.

FIG. 5 shows the second embodiment of the present invention. In the case of the present embodiment, a rectangular projection 49 is formed at the fore edge of the mount plate portion 7. In connection with it, a through hole 50, into which the projection 49 can be lightly pressed (i.e., into which the projection 49 can be inserted with a relatively small force), is formed in a central portion of a stop portion 48 and at the fore end of the interconnecting plate 47 as a constituent of the energy absorbing member 45a. Upon assembly of the shock absorbing steering column apparatus, the projection 49 is pushed halfway into the through hole 50. A positioning bent edge 56 is formed at the rear edge (the right edge in FIG. 5) of the belt portion 39. When the bent edge 56 is in contact with the rear edge (the right end face in FIG. 1) of the stop member 9 (FIG. 1), the projection 49 is intruded halfway into the through hole 50. In this state, a clearance exists between a far-side face 51 of the stop portion 48 and the fore edge 7a of the mount plate portion 7.

Upon secondary collision the mount plate portion 7 is displaced forward until the clearance is decreased to zero, and then the second folded portion 41 (FIGS. 1 to 4) starts being plastically deformed. Accordingly, the moment when the second folded portion 41 starts being plastically deformed lags behind the moment when the mount plate portion 7 starts moving against a static friction acting between the mount plate portion 7 and the stop member 9. As a result, as compared with a case where these moments are coincident with each other, the impact exerted on the driver's body colliding with the steering wheel can be reduced even more. The other structure and operation are the same as in the first embodiment described above.

Figure 6:
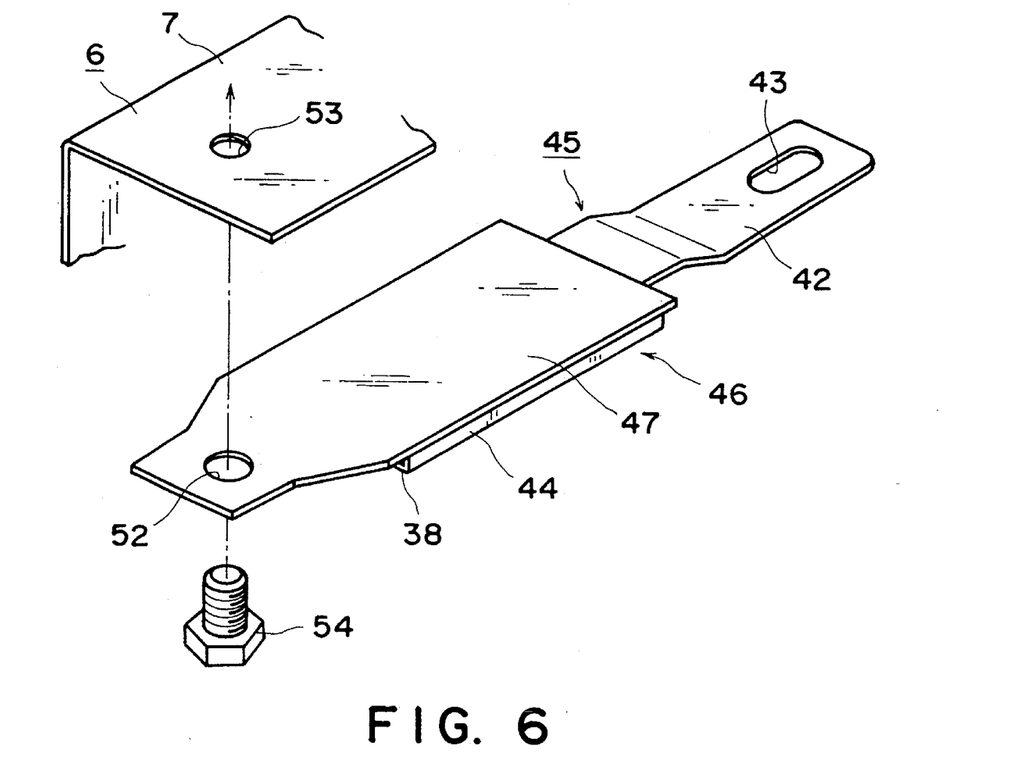
FIG. 6 is a perspective view showing a third embodiment of the present invention, similar to FIG. 5.

Next, FIG. 6 shows the third embodiment of the present invention. The present embodiment is different from the first embodiment described previously and the second embodiment described above in the structure for engaging the interconnecting plate 47 with the mount plate portion 7. In the case of the present embodiment, a circular hole 52 is formed in the front end portion (left end portion in FIG. 6) of the interconnecting plate 47, and a thread hole 53 is formed in the front end portion (the left end portion in FIG. 6) of the mount plate portion 7. Then a screw 54 is inserted from the bottom through the circular hole 52, engaged with the thread hole 53 and tightened, thereby engaging the interconnecting plate 47 with the mount plate portion 7. The other structure and operation are the same as in the first embodiment described previously.

Figure 7:
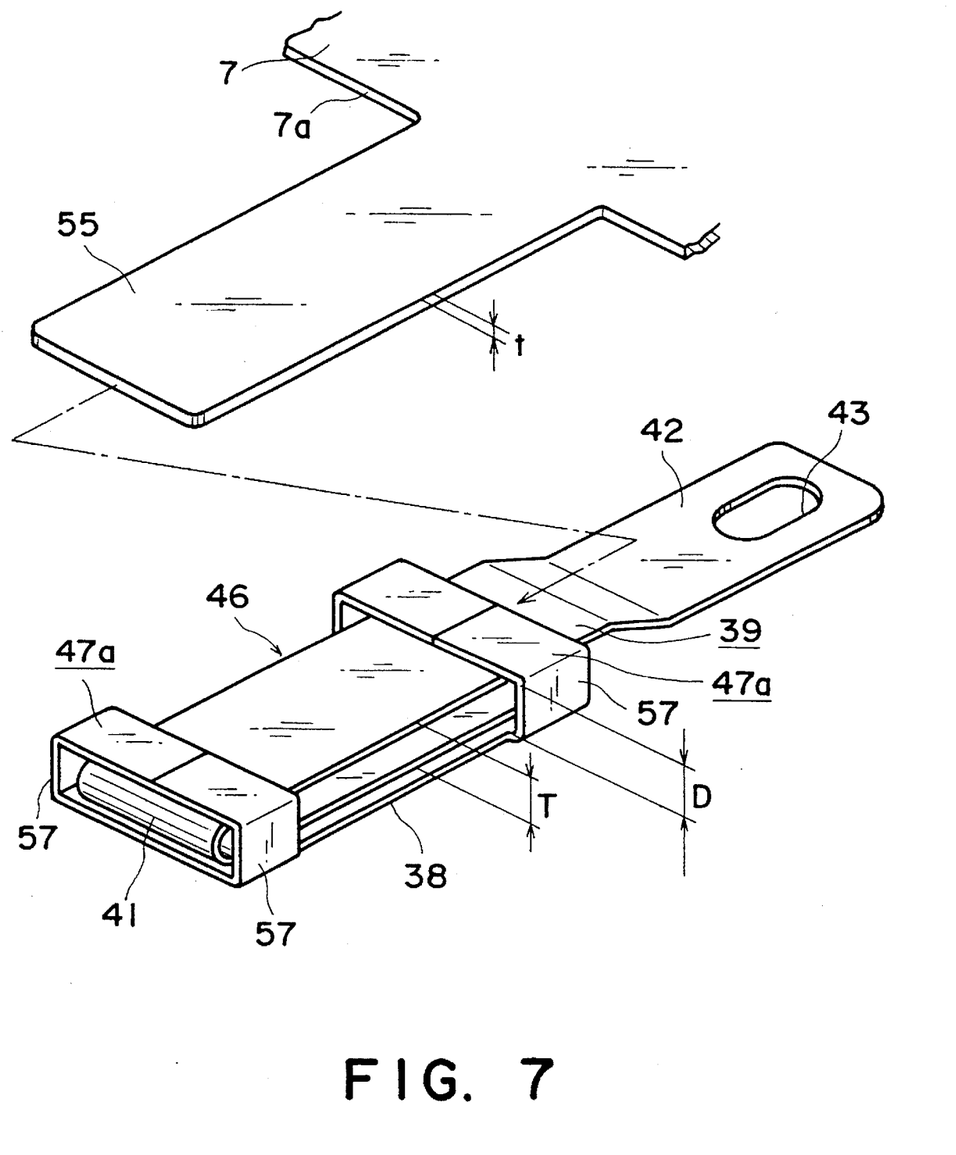
FIG. 7 is a perspective view showing a fourth embodiment of the present invention, similar to FIG. 5.

Next, FIG. 7 shows the fourth embodiment of the present invention. In the above-described embodiments the distance between the upper surface of the base 38 and the lower surface of the interconnecting plate 47 is made equal to the thickness of the middle portion of the belt portion 39 with the second folded portion 41 formed therein, thereby keeping the middle portion in direct contact with the lower surface of the interconnecting plate 47. In contrast, in the case of the present embodiment, a holding plate portion 55 projecting from the front edge 7a of the mount plate portion 7 is interposed between the upper surface of the middle portion and lower surfaces of interconnecting plates 47a, 47a, so that the lower surface of the holding plate portion 55 is kept in contact with the upper surface of the middle portion.

Namely, in the case of the present embodiment, two pairs of front and back bent portions 57, 57 are formed by bending them upward from both edges and from both front and back ends of the base 38. The upper ends of the two pairs of front and back bent portions 57, 57 are further bent inward in the transverse direction of the base 38 so the distal ends of the bent portions abut against each other, and the abutting portions are welded to each other, thereby forming the pair of front and back interconnecting plates 47a, 47a. The distance D between the lower surface of each interconnecting plate 47a, 47a and the upper surface of the base 38 is determined to be a sum of a thickness T of the middle portion and a thickness t of the holding plate portion 55 (D=T+t).

Upon assembly of the shock absorbing steering column apparatus, the holding plate portion 55 is inserted into the clearance between the lower surfaces of both interconnecting plates 47a, 47a and the upper surface of the middle portion. Upon the secondary collision, the front edge 7a of the mount plate portion 7 pushes the rear edge (the right edge in FIG. 7) of the bent portion 57, on the rear side (on the right side in FIG. 7) to displace the base 38 forward (to the left in FIG. 7). The other structure and operation are the same as in the first embodiment described previously. As a modification of the present embodiment, a wide bent portion and interconnecting portion may be formed by continuously connecting the pair of front and back bent portions 57, 7 with each other and the pair of front and back interconnecting plates 47a, 47a with each other. Further, the lower surface of the wide interconnecting plate thus constructed may be arranged to directly contact with the upper surface of the middle portion of the belt portion 39.

Figure 8:
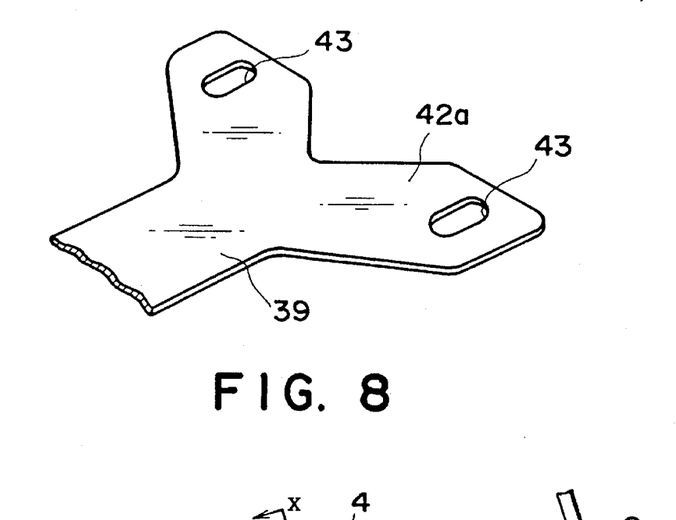
FIG. 8 is a partial, perspective view of an energy absorbing member showing a fifth embodiment of the present invention.

Next, FIG. 8 shows the fifth embodiment of the present invention. In the above-described embodiments a pair of left and right energy absorbing members are assumed to be set to construct the shock absorbing steering column apparatus, whereas in the case of the present embodiment only one energy absorbing member is provided in the central portion to construct the shock absorbing steering column apparatus. The present embodiment is so arranged that the fore end (the right end in FIG. 8) of the belt portion 39 is bifurcated to form a connecting portion 42a and through holes 43, 43, each for the bolt 10 (FIGS. 1 and 2) to be inserted thereinto, are formed in left and right end portions of the connecting portion 42a. Although omitted in FIG. 8, the front end portion of the interconnecting plate is fixed, for example by a screw to the upper surface of the middle portion of the steering column.

Because of the above-described structure and operation, the energy absorbing members for shock absorbing steering column apparatus of the present invention can reduce the work for component control and production and can decrease the costs of the shock absorbing steering column apparatus. In addition, the members can be assembled, for example, a compact bracket portion, which was difficult with the conventional members. Thus, the invention can contribute to an improvement in safety for compact cars.

What is claimed is:

1. A shock absorbing steering column apparatus, comprising:
   an energy absorbing member disposed between a mounting member fixed to a tubular steering column into which a steering shaft is rotatably inserted and a portion fixed to a vehicle body, and which permits the steering column to be displaced forward while absorbing impact energy applied to the steering column upon a collision, said energy absorbing member including:
   a base;
   a plastically deformable belt portion extending from a rear edge of the base;
   a first folded portion formed by folding a base end portion of the belt portion forward approximately 180 degrees with a first radius of curvature;
   a second folded portion formed by folding a middle portion of said belt portion with a second radius of curvature larger than said first radius of curvature in an opposite direction to that of said first folded portion;
   a connecting portion formed in a fore end portion of said belt portion and projecting backward relative to the rear edge of said base for connecting the fore end portion of the belt portion with said portion fixed to the vehicle body;
   a pair of bent portions bent from opposite sides of said base toward a side where said belt portion is present; and
   an interconnecting plate fixed to free edges of said pair of bent portions such that a distance between said interconnecting plate and said base is substantially equal to a thickness of the folded middle portion of said belt portion, said interconnecting plate being distinct from said mounting member and mounted on said mounting member.

2. A shock absorbing steering column apparatus according to claim 1, wherein said interconnecting plate includes a stop portion that receives a portion of said mounting member.

3. A shock absorbing steering column apparatus according to claim 2, wherein said stop portion has a substantially C-shaped cross section.

4. A shock absorbing steering column apparatus according to claim 2, wherein said stop portion has a hole and said mounting member has a projection that extends into said hole.

5. A shock absorbing steering column apparatus according to claim 2, wherein said connecting portion has a projection that positions said energy absorbing member.

6. A shock absorbing steering column apparatus according to claim 1, wherein a hole is formed in said interconnecting plate, a hole is formed in said mounting member, and a fastener is inserted in each of said holes to connect said interconnecting plate to said mounting member.

7. A shock absorbing steering column apparatus according to claim 1, wherein said connecting portion includes two holes and a fastener extends through each of said holes to connect said belt portion to said portion fixed to the vehicle body.

8. A shock absorbing steering column apparatus, comprising:
   a steering column into which a steering shaft is rotatably inserted;
   a mounting member fixed to said steering column; and
   an energy absorbing member connected to said mounting member and a portion fixed to a vehicle body, said energy absorbing member permitting said steering column to be displaced relative to the vehicle body while absorbing impact energy applied to said steering column upon a collision, said energy absorbing member including:

a base;

a plastically deformable belt portion extending from a first edge of the base and having a first folded portion formed by folding a base end portion of the belt portion approximately 180 degrees toward a second edge of the base located opposite to said first edge with a first radius of curvature, a second folded portion formed by folding a middle portion of the belt portion in a direction opposite to that of said first folded portion with a second radius of curvature larger than said first radius of curvature, and a connecting portion for connecting said belt portion to said portion fixed to the vehicle body;

a pair of bent portions extending from two side edges of the base toward a side of said base where said belt portion is present; and an interconnecting member fixed to free edges of said pair of bent portions such that a distance between said interconnecting member and said base is substantially equal to a thickness of said folded middle portion of the belt portion, said interconnecting member being distinct from said mounting member and mounted on said mounting member.

9. A shock absorbing steering column apparatus according to claim 8, wherein said interconnecting member includes a stop portion that receives a portion of said mounting member.

10. A shock absorbing steering column apparatus according to claim 9, wherein said stop portion has a substantially C-shaped cross section.

11. A shock absorbing steering column apparatus according to claim 9, wherein said stop portion has a hole and said mounting member has a projection that extends into said hole.

12. A shock absorbing steering column apparatus according to claim 9, wherein said connecting portion has a projection that positions said energy absorbing member.

13. A shock absorbing steering column apparatus according to claim 8, wherein a hole is formed in said interconnecting member, a hole is formed in said mounting member, and a fastener is inserted in each of said holes to connect said interconnecting member to said mounting member.

14. A shock absorbing steering column apparatus according to claim 8, wherein said connecting portion includes two holes and a fastener extends through each of said holes to connect said belt portion to said portion fixed to the vehicle body.

* * * * *